Figure 3:
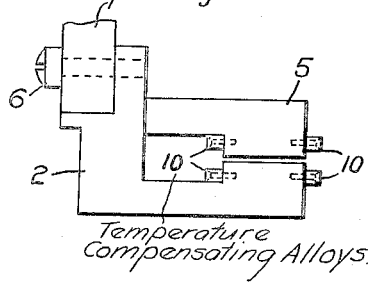

Feb. 19, 1929.　　　　　　　　　　　　　　　　　1,702,457
G. WALL
ELECTRICAL MEASURING INSTRUMENT
Filed Oct. 16, 1925　　　　4 Sheets-Sheet 1
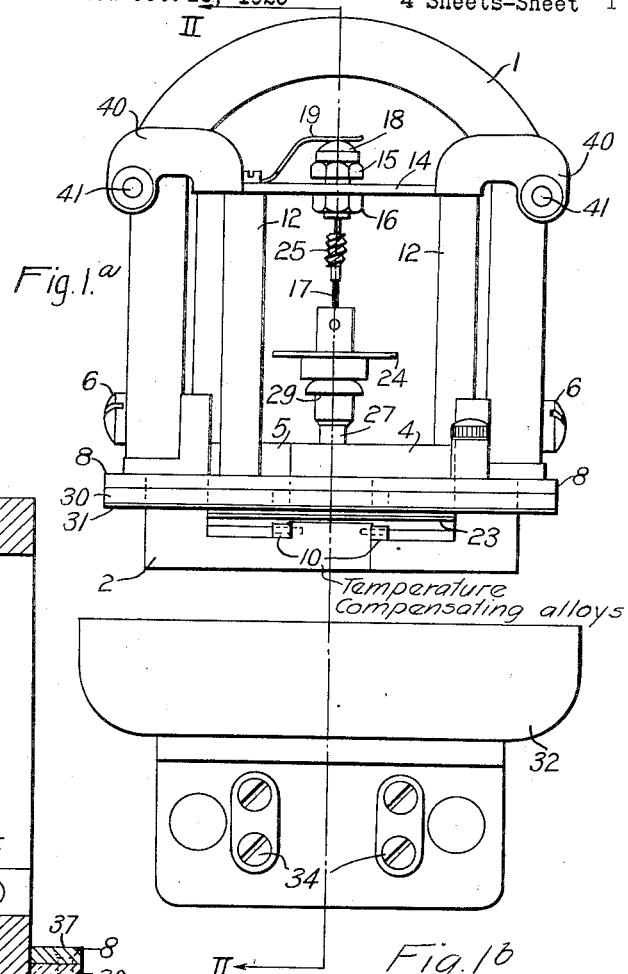
Fig. 1ᵃ
Fig. 1ᵇ
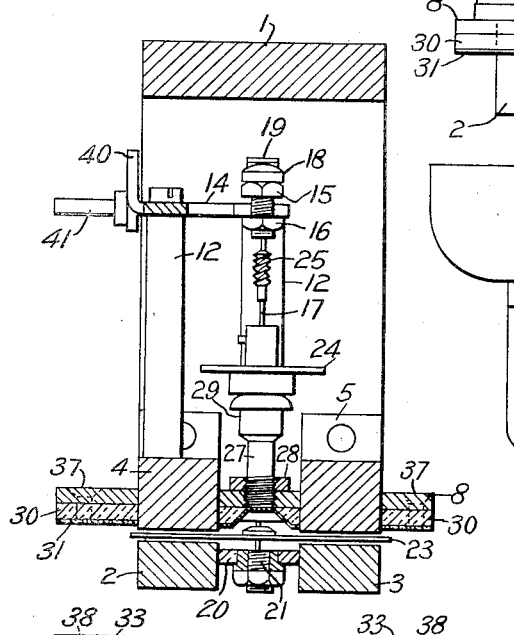
Fig. 2ᵃ
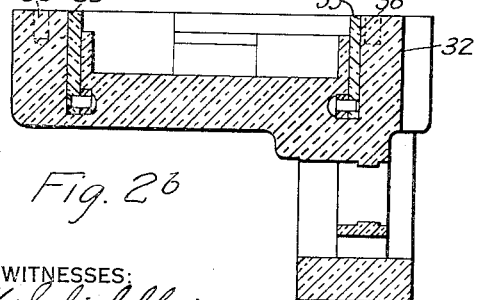
Fig. 2ᵇ
WITNESSES:
INVENTOR
George Wall.
BY
Wesley G. Carr
ATTORNEY Feb. 19, 1929.  
G. WALL  
1,702,457  
ELECTRICAL MEASURING INSTRUMENT  
Filed Oct. 16, 1925   4 Sheets-Sheet 2

Temperature Compensating Alloys.

WITNESSES:  
A. M. Schiefelbein.  
F. H. Miller

INVENTOR  
George Wall  
BY  
Wesley G. Carr  
ATTORNEY

Feb. 19, 1929.
G. WALL
1,702,457
ELECTRICAL MEASURING INSTRUMENT
Filed Oct. 16, 1925
4 Sheets-Sheet 3

WITNESSES:
A. J. Schiefelbein
F. H. Miller

INVENTOR
George Wall.
BY
Wesley G. Carr
ATTORNEY

Feb. 19, 1929.   G. WALL   1,702,457
ELECTRICAL MEASURING INSTRUMENT
Filed Oct. 16, 1925   4 Sheets-Sheet 4

WITNESSES:

INVENTOR
George Wall
BY
Wesley G. Carr
ATTORNEY

Patented Feb. 19, 1929.

1,702,457

UNITED STATES PATENT OFFICE.

GEORGE WALL, OF URMSTON, ENGLAND, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed October 16, 1925, Serial No. 62,747, and in Great Britain October 18, 1924.

My invention relates to electric measuring instruments and particularly to integrating instruments of the ampere-hour and watt-hour meter type.

One object of my invention is to provide an instrument, of the above-indicated character, in which the parts shall be readily accessible for adjustment.

Another object of my invention is to provide an electrical measuring instrument that shall be so compensated for errors caused by temperature changes as to render it accurate under all operating conditions.

Another object of my invention is to provide an integrating instrument of the watt-hour-meter type in which a plurality of damping-magnet gaps are so disposed in series relation as to materially improve the operation of the instrument.

Another object of my invention is to provide a mercury meter in which certain parts are so mounted on the cover member of a mercury well or container as to permit their removal as a unit without interrupting the magnetic circuit or disturbing the relation of a disk armature thereto.

Another object of my invention is to provide a mercury meter in which a disk armature and permanent magnets therefor may be conveniently immersed in mercury.

Another object of my invention is to provide a novel means for adjusting the rate of rotation of the disk armature of an integrating meter by adjusting the radial distance of the center of the disk from the gap or gaps between the magnet poles.

A further object of my invention is to provide an integrating meter that shall be simple and durable in construction, economical to manufacture and efficient in its operation.

In integrating meters, such as ampere-hour and watt-hour meters, it is usual to employ a disk armature which rotates between the poles of a permanent magnet to provide a braking action upon the meter spindle.

In such meters, temperature variations from the temperature at which the meters are calibrated seriously affect the operation thereof and render the same inaccurate.

According to this invention, the poles of the magnet or magnets, between which such a disk rotates, are provided with pole structures including material of such characteristics that its magnetic permeability decreases with increase of temperature.

Thus, without recourse to complicated and expensive mechanism, which must be carefully designed and frequently adjusted, or to the usual bimetallic strips which become inaccurate through fatigue, a meter of this type is rendered substantially inherently or self-compensated in an extremely simple, permanent and inexpensive manner.

Other features, such as those outlined in the above-mentioned objects of my invention, are so combined with the temperature-compensating means as to provide an integrating meter that is a material advance in the art.

Fig. 1ª of the accompanying drawings is a front elevational view of a mercury-motor ampere-hour meter embodying my invention, with the cover removed and the instrument partially disassembled, Fig. 1ᵇ is a view similar to Fig. 1ª of the mercury cup.

Fig. 2ª is a view taken along the line II—II of Fig. 1ª, as viewed in the direction of the arrows.

Fig. 2ᵇ is a view similar to Fig. 2ª of the mercury cup in Fig. 1ᵇ.

Figure 4:
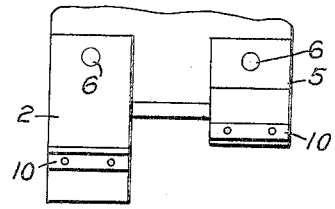
Figure 5:
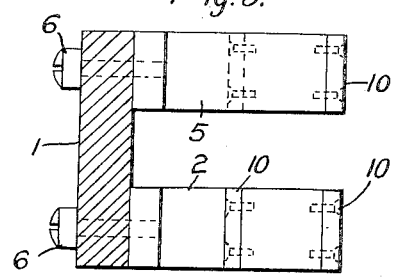
Figure 6:
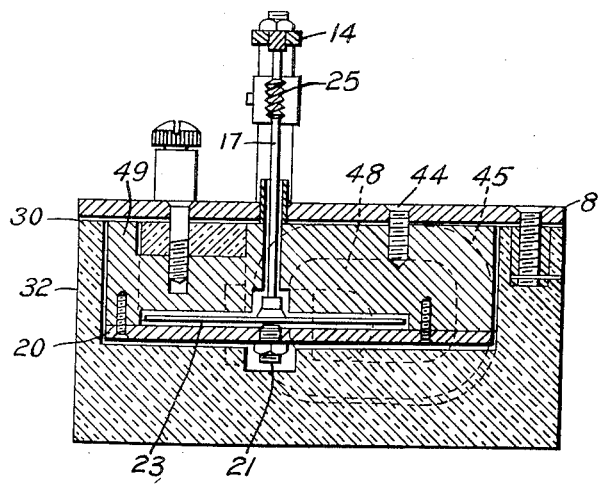
Figure 7:
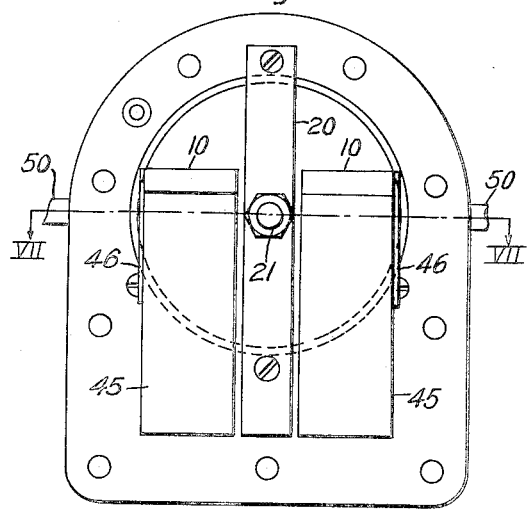
Figure 8:
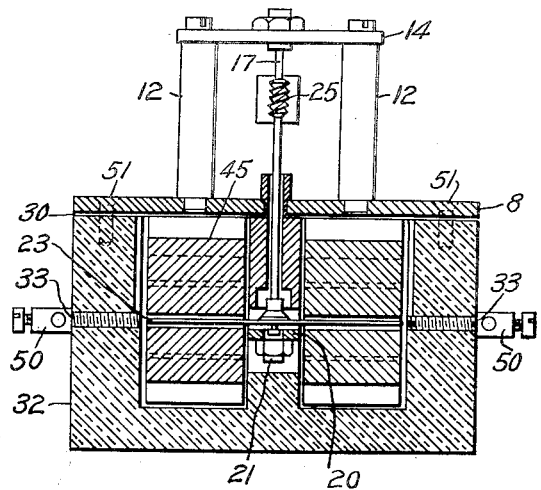
Figure 9:
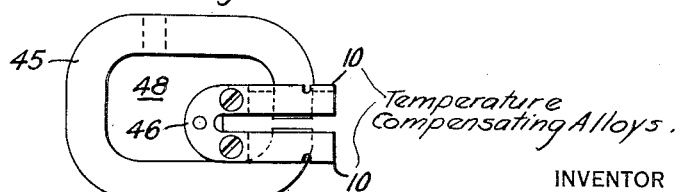
Figure 10:
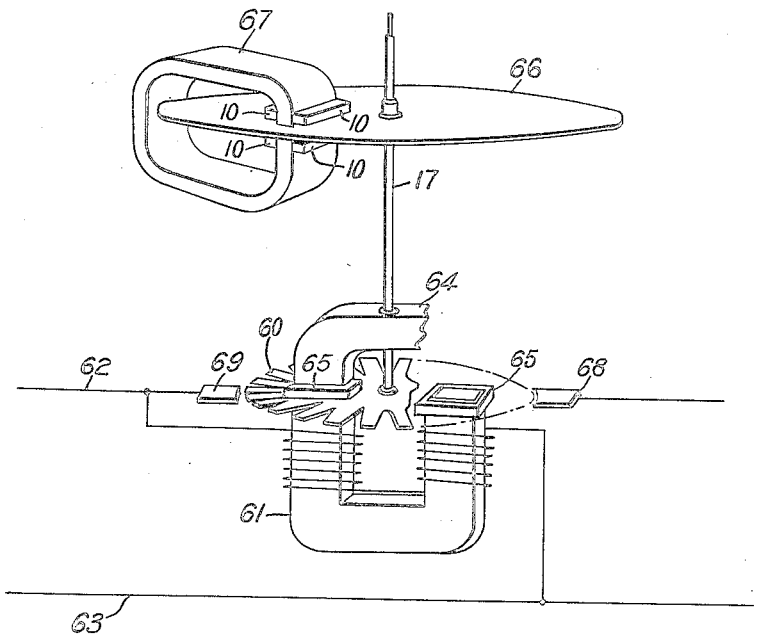
Figure 11:
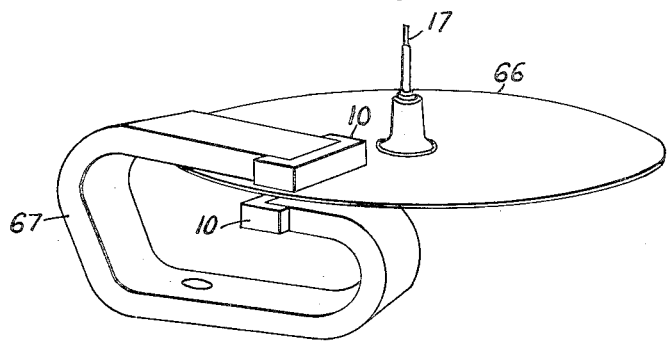

Fig. 3 is a detail view, in front elevation, of one of the pole-structures of the meter shown in Figs. 1ª and 2ª, Fig. 4 is a side elevational view of the structure shown in Fig. 3, Fig. 5 is a plan view of the structure shown in Figs. 3 and 4, Fig. 6 is a view, partially in section and partially in side elevation, of a mercury-motor ampere-hour meter of another type, embodying features of my invention, Fig. 7 is a bottom plan view of the meter shown in Fig. 6, with a base member or mercury trough removed, Fig. 8 is a view taken along the line VII—VII of Fig. 7, showing the mercury trough in position, Fig. 9 is a side elevational view of one of the magnets used in the meter of Figs. 6 7 and 8, Fig. 10 is a diagrammatic perspective view of a mercury-motor direct-current meter of another type, embodying features of my invention, and Fig. 11 is a view similar to a portion of Fig. 10, showing a different form of brake magnet for the meter of Fig. 10.

In all of the figures, corresponding parts are designated by corresponding reference characters.

Referring to Figs. 1a and 2a, a permanent magnet 1 is provided with four pole pieces 2, 3, 4, and 5, which are secured to the magnet 1, by means of screws 6, and to a brass base plate 8 in any desired manner, as by press fitting them in the base plate 8.

Each of the pole faces of the pole pieces 2, 3, 4, and 5 is equipped with members or projections 10 of material of which the magnetic permeability decreases with a rise in temperature.

The pole piece assembly of one pole is shown in detail in Figures 3, 4 and 5.

Two pillars 12 project upwardly from the base plate 8 and support a plate 14, which has, near its center, a screw-threaded bushing 15 held by a lock nut 16 to form a bearing for the top pivot of a meter spindle 17. A headed plunger member 18, which slides in the bushing 15 and forms an abutment for the upper end of the spindle 17, is depressed by a leaf spring 19. A brass plate 20 extends diagonally across the bottom pole pieces 2 and 4 to which it is secured, as by screws or rivets, and supports, at its center, a jewel bushing 21 which constitutes the lower pivot bearing for the meter spindle 17.

A circular disk 23, which constitutes the rotor of the meter, is mounted on the meter spindle 17 which is provided with a collar 24 and a worm 25 for driving any suitable counting mechanism.

A bushing 27 is screwed into the base plate 8 and secured in position by a lock nut 28. A collar 29 slides upon the outside of the bushing 27 and has its upper end faced so that, when raised by a lever arrangement (not shown), it provides a mercury seal with the collar 24 and, at the same time, raises the lower pivot of the spindle 17 from the jewel bearing 21.

In order to prevent the mercury attacking the brass base plate, the latter is covered on its lower side with a mercury resisting washer or facing 30 and another thin sealing washer 31 is provided to render the joint with the mercury container tight.

The mercury container 32 consists of moulded insulating material and conforms to the configuration of that part of the meter assembly, previously described, which is below the base plate 8 and washers 30 and 31 so as to economize in the amount of mercury required. Externally, the moulding may take any convenient shape and contact members 33, for leading the current to and from the mercury, are moulded into the insulating material, together with leads (not shown), to terminal binding screws 34.

The mercury container 32 is secured to the meter assembly by means of a plurality of screws extending through holes 37 in the brass base plate 8 into tapped holes 38 in the mercury container 32.

The top plate 14 is provided with bent lugs 40 from which pins 41 extend for the purpose of carrying the counting gear which is to be driven by the worm 25.

In operation, the meter functions in exactly the same manner as mercury-motor meters of well-known types, the current traversing the disk 23 in the magnetic field of the magnet 1 to cause rotation thereof and the necessary braking action being obtained by reason of the eddy currents set up in the disk.

In a meter of the above-described construction, the entire mechanism of the meter may readily be removed from the mercury container 32 by unscrewing the holding screws 37, so that the disk 23 and the lower pivot may be examined without disturbing the mechanism or breaking the magnetic circuit. Thus, the risk of seriously disturbing the operation of the meter by examinations of this kind is minimized.

The arrangement of the meter magnet pole pieces whereby the two magnetic gaps are in parallel, instead of in series as is usual in meters of this type, lowers both the reluctance and the magnetic leakage of the magnetic circuit.

The pole projections 10, the dimensions of which must be found by trial, since they depend upon the precise construction of the meter and the nature of the material from which they are made, cause the rate of movement of the meter spindle 17 to be substantially independent of temperature, a suitable material therefor being a ferro-nickel alloy.

Referring to Figures 6, 7 and 8, a modified form of meter according to this invention comprises a brass base plate 8, having secured thereto as by set screws 44, two cobalt steel permanent magnets 45 of substantially C-shape. The form of the magnets 45 is clearly shown in Fig. 9.

The poles of the magnets are provided with projections 10, similar to those of the above-described form of my invention, which are secured to the poles by sheet metal strips 46, screwed and dowelled to a block of insulating material 48, which fills the central space of the magnet 45. The base plate 8 carries, a pillar 49 on its lower side. A bridge member 20 is secured to the pillar 49 and to a body of insulating material which is secured to the base plate 8 between the two magnets. The bridge member 20 carries, at its center, a jewelled bushing 21 which constitutes the lower pivot bearing for the meter spindle 17.

Two pillars 12 project upwardly from the base plate 8 and carry a bridge member 14 at the upper ends thereof. A screw-threaded bushing 15 is secured to the center of the bridge member 14 and constitutes the upper pivot bearing of meter spindle 17. The meter spindle 17 is provided with a circular disk 23 which lies in the gap between the poles of the magnets 45 and constitutes both the driving and braking means. A worm 25 is also provided on the meter spindle to engage the counting mechanism.

The mercury container 32 is formed of moulded insulating material and, similarly to the above-described structure, conforms to the contour of the magnets and meter parts below the base plate 8. Contact members 33, which may be equipped with terminals 50 are moulded into the mercury container 32 to conduct current to the mercury. The mercury container is secured to the base plate 8 by means of screws 51. An insulating washer 30 is provided upon the lower face of the base-plate 8 to prevent the mercury acting thereon.

The meter thus constructed is extremely compact and all of the meter parts may be removed from the mercury container for examination, without disturbing the operative relation thereof. The rate of movement of the meter spindle may be adjusted by rotating one or both of the magnets 45 about the securing screws 44, so as to change the radial distance of the gap between the poles from the center of the disk 23. By proper adjustment of the dimensions and shape of the projections 10, the rate of movement of the meter element may be made substantially independent of temperature.

Referring to Fig. 10, which represents diagrammatically a direct-current watt-hour meter of the mercury-motor type, a rotor disk 60 adapted to be immersed in a mercury trough (not shown), lies across the poles of an electromagnet 61 which is excited by current shunted from main line conductors 62 and 63, in proportion to the voltage of the mains. The magnetic circuit is completed by means of a yoke 64, of which a portion is broken away in the drawing. The pole end portions of both the magnet 61 and the yoke 64 are provided with rings or bands 65 of material similar to the material of the above-described polar projections 10. The spindle 17 of the rotor also carries an aluminum or a copper disk 66 which rotates between the poles of a permanent magnet 67 constituting the brake for the meter. The magnet 67 is also provided with pole portions 10 of material having the property of changing its permeability with variations in temperature. The series current is conducted by contact members 68 and 69, to the rotor disk 60, through the mercury in which it is immersed.

By appropriate adjustment of the dimensions of the portions 65 and 10, the rate of rotation of the meter spindle may be made substantially independent of temperature.

In the form of my invention shown in Fig. 11, the members 10 are of substantially C-shape extending around the sides and ends of a damping magnet 67.

While I have shown my invention as applied to direct-current mercury meters, it may readily be applied to direct-current commutator meters, alternating-current induction meters and to other devices employing magnets and which are similarly affected by temperature changes.

Various changes may therefore, be effected in the invention without departing from the spirit and scope thereof, as set forth in the appended claims.

I claim as my invention:

1. In an electrical measuring instrument, the combination with a mercury-containing casing, of a unitary structure comprising a cover member for the casing, an armature-supporting structure mounted on the cover member, an armature carried by said supporting structure for disposition in the mercury and a permanent magnet for said armature.

2. In an electrical measuring instrument, the combination with a mercury-containing casing, of a unitary structure comprising a cover member for the casing, a permanent magnet mounted on the cover member in said mercury-containing casing, an armature-supporting structure mounted on the cover member and an armature carried by said supporting structure for disposition in the mercury adjacent to said magnet.

3. In an electrical measuring instrument, the combination with a mercury-containing casing, of a unitary structure comprising a cover member for the casing, an armature-supporting structure mounted on the cover member, a disk armature carried by said supporting structure for disposition in the mercury, and a permanent magnet movably mounted on the cover member for adjusting the radial distance between the center of the disk and a pole end of the magnet.

4. An electric meter having a permanent-magnet disc-damping system, means for compensating the meter for errors incident to temperature changes comprising members of an alloy having a negative temperature coefficient of permeability secured to said system in series-circuit relation with a portion of the flux traversing said disc.

5. An electrical measuring instrument comprising a disc armature, a permanent magnet for causing a flux to cut said disc, and means including a magnetic material having a permeability responsive to temperature changes disposed in the path of said flux for compensating the instrument for errors incident to changes in temperature.

6. In combination, a rotating member and a permanent magnet for causing a magnetic flux to traverse said member, and means comprising a material having a more pronounced temperature coefficient of permeability than that of said permanent magnet in the path of a portion of said flux for compensating the rotating member for errors incident to changes of temperature.

7. An electrical measuring instrument comprising a disc armature, a permanent damping magnet for said disc, said magnet having a separate body of magnetizable material having a different temperature coefficient of permeability than the material of said magnet mounted on each pole end thereof, whereby the damping field of said magnet is modified to correct temperature errors in said instrument.

In testimony whereof, I have hereunto subscribed my name this 29th day of September 1925.

GEORGE WALL.